(12) United States Patent
Fukumoto et al.

(10) Patent No.: US 10,437,526 B2
(45) Date of Patent: Oct. 8, 2019

(54) PRINTING METHOD, SOUND CONTROL SYSTEM, AND PROGRAM

(71) Applicant: CANON KABUSHIKI KAISHA, Tokyo (JP)

(72) Inventors: Takuji Fukumoto, Inagi (JP); Jun Hirota, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/141,836

(22) Filed: Sep. 25, 2018

(65) Prior Publication Data

US 2019/0102116 A1 Apr. 4, 2019

(30) Foreign Application Priority Data

Oct. 3, 2017 (JP) .................................. 2017-193778

(51) Int. Cl.
*G06F 3/12* (2006.01)
*G06F 3/16* (2006.01)

(52) U.S. Cl.
CPC .......... *G06F 3/1204* (2013.01); *G06F 3/1268* (2013.01); *G06F 3/1292* (2013.01); *G06F 3/167* (2013.01)

(58) Field of Classification Search
CPC .... G06F 3/1292; G06F 3/1293; G06F 3/1285; G06F 3/167; G10L 17/00; H04W 2201/0096; H04N 1/00403
See application file for complete search history.

(56) References Cited

U.S. PATENT DOCUMENTS

| 2001/0025348 A1* | 9/2001 | Takaragi ................ G06F 21/32 726/32 |
| 2014/0104635 A1* | 4/2014 | Nishikawa ......... H04N 1/00238 358/1.14 |
| 2016/0034253 A1* | 2/2016 | Bang .................. G06F 3/04883 715/728 |
| 2016/0042574 A1* | 2/2016 | Yoshie ...................... B41J 3/44 358/3.28 |
| 2018/0191666 A1* | 7/2018 | Rahman ................. H04L 67/16 |

FOREIGN PATENT DOCUMENTS

JP 2015-100020 A 5/2015

* cited by examiner

*Primary Examiner* — Moustapha Diaby
(74) *Attorney, Agent, or Firm* — Canon U.S.A., Inc. IP Division

(57) ABSTRACT

When sound data corresponding to predetermined sound is input to a sound control system, the sound control system transmits identification information of a printer to a terminal device. The terminal device transmits print data to the printer based on the identification information of the printer.

15 Claims, 18 Drawing Sheets

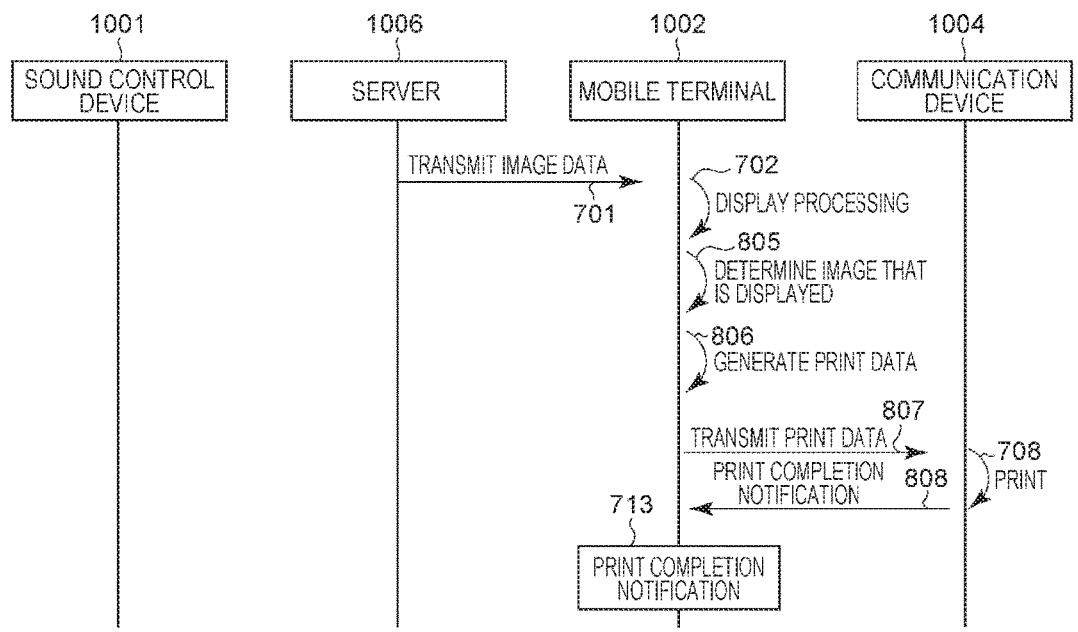

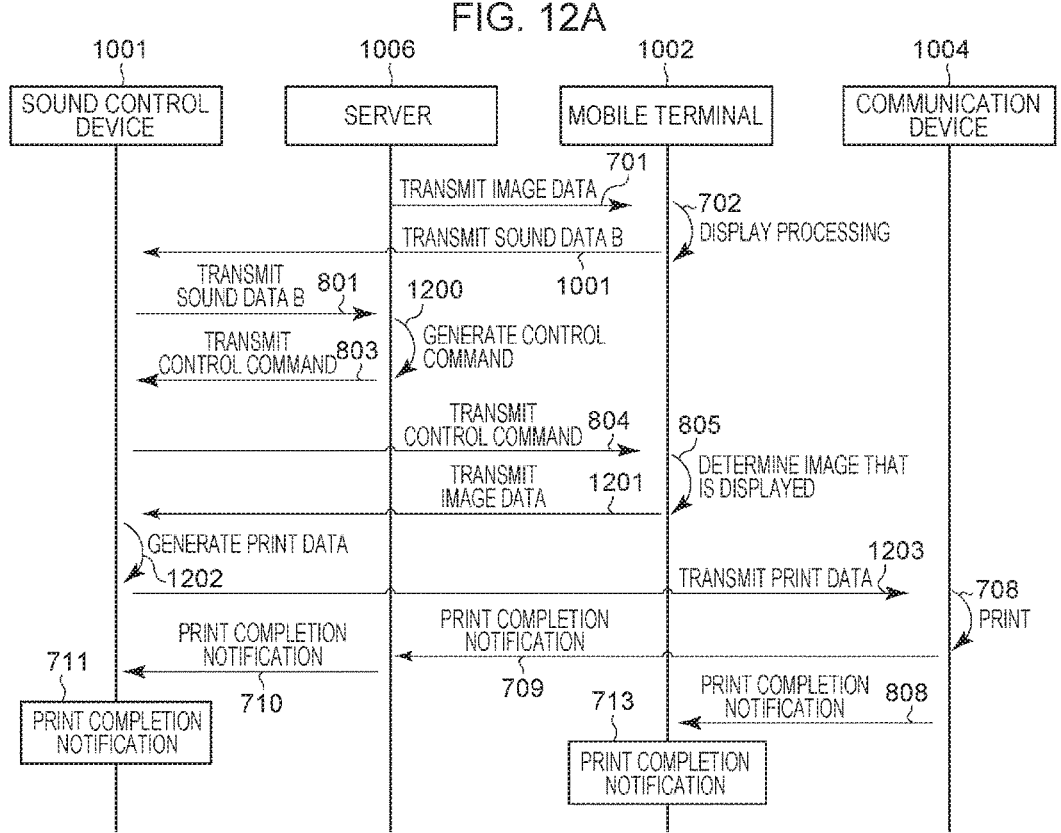

FIG. 15

| MANUFACTURER | SERVER COOPERATION | SETTING METHOD | SERVER IN COOPERATION |
|---|---|---|---|
| COMPANY A | ○ | SCREEN DISPLAY | SERVER A |
| COMPANY B | ○ | INVITATION PAGE | SERVER B |
| COMPANY C | ○ | MOBILE TERMINAL | SERVER C |
| COMPANY D | × | × | × |
| COMPANY E | ○ | SCREEN DISPLAY | SERVER E |

PRINTING METHOD, SOUND CONTROL SYSTEM, AND PROGRAM

BACKGROUND

Field

The present disclosure relates to a printing method, a sound control system, and a program that execute printing based on sound data.

Description of the Related Art

Japanese Patent Laid-Open No. 2015-100020 discloses a technique of executing a print instruction when a print button displayed on a mobile terminal is pressed.

However, a user needs to press the print button to instruct printing in Japanese Patent Laid-Open No. 2015-100020.

In recent years, a printer has been used in various scenes and a technique of further improving operability of a print instruction has been required.

SUMMARY

A printing method for a sound control system that receives sound data, a printer, and a terminal device includes a storage step at which the sound control system stores identification information of the printer, a first transmission step at which, when first sound data corresponding to predetermined sound is input to the sound control system, the sound control system transmits the stored identification information of the printer to the terminal device, a second transmission step at which the terminal device transmits print data to the printer based on the transmitted identification information of the printer, and a print step at which the printer executes printing based on the transmitted print data.

Further features will become apparent from the following description of exemplary embodiments with reference to the attached drawings.

BRIEF DESCRIPTION OF THE DRAWINGS

FIGS. 10A and 10B are sequence views for explaining an example of print processing executed by a print instruction provided by voice of the user to the mobile terminal.

FIGS. 12A and 12B are sequence views for explaining another example of print processing executed by a print instruction provided by voice of the user to the mobile terminal.

FIG. 15 illustrates an example of a table held by the communication device.

DESCRIPTION OF THE EMBODIMENTS (First Embodiment)

Figure 1:
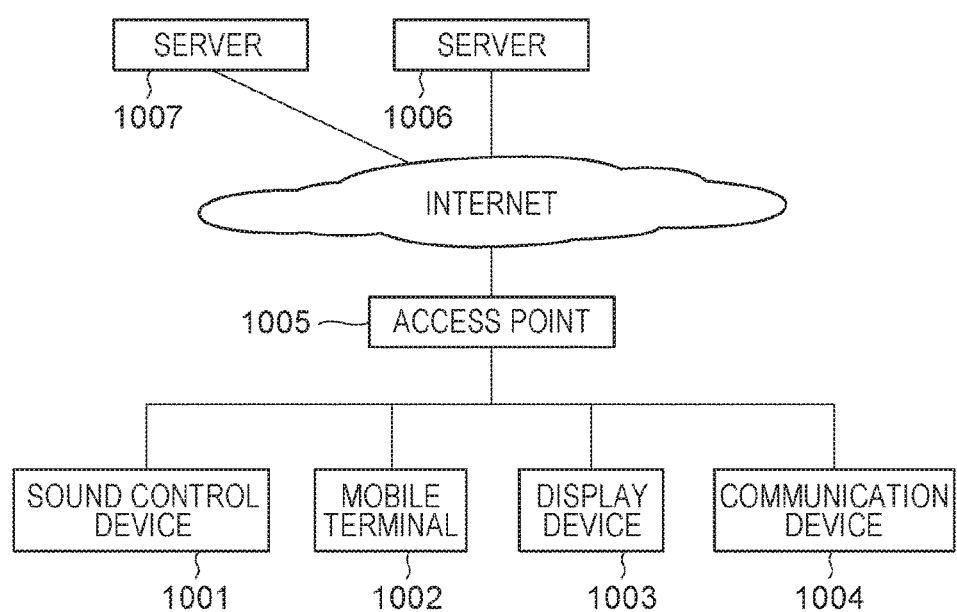
FIG. 1 illustrates an example of a structure view of a printing system.

FIG. 1 illustrates an example of a structure view of a printing system according to the present embodiment. The printing system of the present embodiment includes, for example, a sound control device 1001, a mobile terminal 1002, a display device 1003, a communication device 1004, an access point (AP) 1005, and a server 1006. The sound control device 1001 is, for example, a smart speaker or the like. The mobile terminal 1002 is any mobile terminal device, for example, such as a smartphone, a notebook PC (Personal Computer), a tablet terminal, or a PDA (Personal Digital Assistant). Note that, the following description will be provided by assuming that the mobile terminal 1002 is a smartphone. The mobile terminal is called a terminal device in some cases. The communication device 1004 is, for example, a printer (printing device) that prints an image on a print medium such as a print sheet, but can be a copying machine, a facsimile device, a digital camera, or the like. The communication device 1004 can be a multi-function peripheral including a plurality of functions of a copy function, a FAX function, a print function, and the like. It is assumed below that the communication device 1004 is a printer such as an ink jet printer, a full-color laser beam printer, or a monochrome printer.

The sound control device 1001, the mobile terminal 1002, the display device 1003, and the communication device 1004 can be connected (can communicate) with the server 1006 via the access point 1005 and the Internet. The sound control device 1001, the mobile terminal 1002, the display device 1003, and the communication device 1004 can be connected (can communicate) with each other through the access point 1005.

Figure 2:
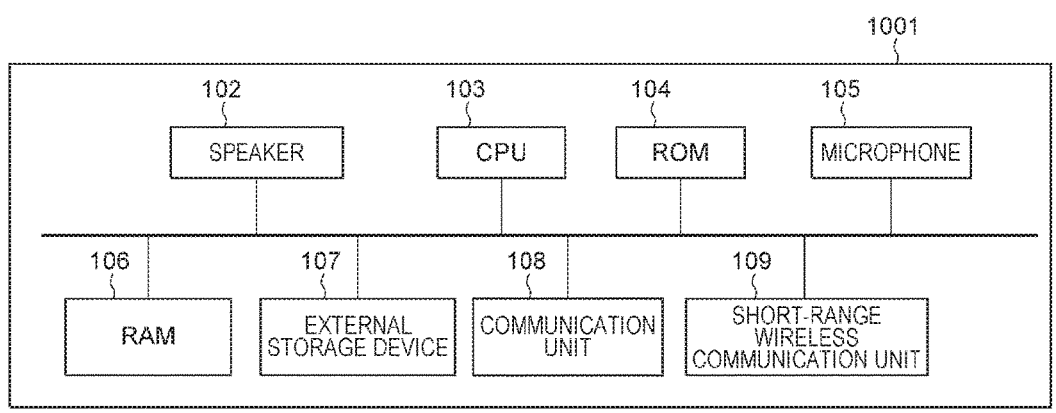
FIG. 2 illustrates an example of a hardware configuration of a sound control device.

FIG. 2 illustrates a hardware configuration of the sound control device 1001. The sound control device 1001 includes a speaker 102, a Central Processing Unit (CPU) 103, a Read Only Memory (ROM) 104, a microphone 105, a Random Access Memory (RAM) 106, an external storage device 107, a communication unit 108, and a short-range wireless communication unit 109. Blocks illustrated in FIGS. 2, 3, 4A, and 4B are connected with each other by using, for example, an internal bus. The components are examples, and each of the devices may include hardware other than the hardware that is illustrated. A plurality of blocks in FIGS. 2, 3, 4A, and 4B can be integrated into one block or one block can be divided into two or more blocks. That is, each of the devices can include any configuration in a range where processing as described below can be executed.

The speaker 102 generates sound by processing described below. The CPU 103 is a system control unit and controls the sound control device 1001. The ROM 104 stores fixed data such as control programs that the CPU 103 executes, a data table, or an embedded Operating System (OS) program. In the present embodiment, the respective control programs stored in the ROM 104 are used for performing software execution control such as scheduling, task switching, and interruption processing under management of the embedded OS stored in the ROM 104. The microphone 105 receives sound generated in the vicinity of the sound control device 1001. The RAM 106 that receives voice uttered by a user, for example, includes, for example, a Static RAM (SRAM) or the like that requires a backup power source. The RAM 106 stores data by using a data backup primary battery (not illustrated), and can thus store data, such as a program control variable, without volatilizing the data. A memory area in which setting information, management data, and the like of the sound control device 1001 are stored is also provided in the RAM 106. The RAM 106 is used also as a main memory and a work memory of the CPU 103. The external storage device 107 stores application software.

The communication unit 108 includes a circuit and an antenna for performing communication based on a predetermined wireless communication method. For example, the communication unit 108 can wirelessly connect to the access point 1005. The communication unit 108 also operates as an access point (AP) that is temporarily used. The access point 1005 can be equipment, for example, such as a wireless LAN router. Wireless communication used in the present embodiment can operate based on a wireless communication method of wireless LAN complying with the IEEE802.11 standard series or based on another wireless communication method.

The short-range wireless communication unit 109 executes short-range wireless communication with another device existing at a fixed short-range distance from the sound control device 1001. The short-range wireless communication unit 109 performs communication by a wireless communication method different from that of the communication unit 108. In the present embodiment, the short-range wireless communication unit 109 operates in accordance with the Bluetooth® standard. In the present embodiment, a communication speed of the wireless communication using the communication unit 108 is higher than a communication speed of the short-range wireless communication using the short-range wireless communication unit 109. In the present embodiment, a communication distance of the wireless communication using the communication unit 108 is longer than a communication distance of the short-range wireless communication using the short-range wireless communication unit 109. The same is applicable to a communication unit and a short-range wireless communication unit of another device described below.

A sound control system in the present embodiment includes the sound control device 1001 and the server 1006. That is, sound data of sound input by the sound control device 1001 is transmitted to the server 1006 and analyzed in the server 1006. Then, the server 1006 performs processing according to an analysis result of the sound data or issues a control command based on the analysis result. The sound control device 1001 receives the control command and performs control based on the control command. The sound control system will be described in detail below.

Figure 3:
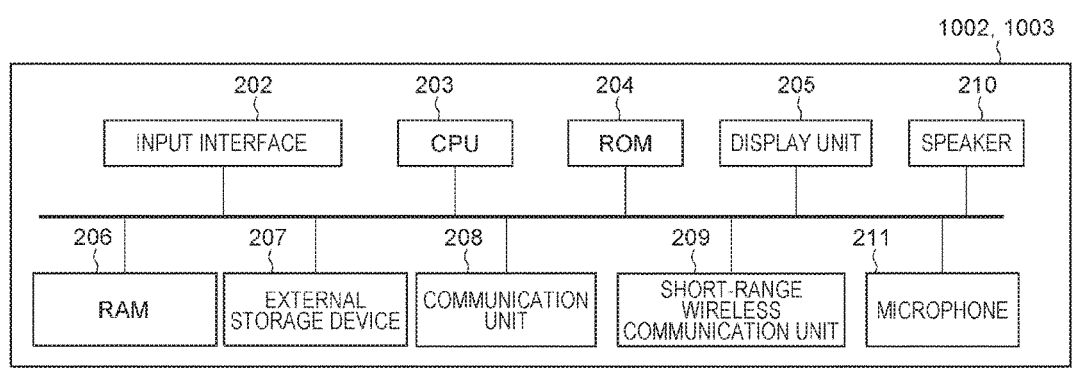
FIG. 3 illustrates an example of a hardware configuration of a mobile terminal and a display device.

FIG. 3 illustrates a hardware configuration of the mobile terminal 1002 and the display device 1003. The mobile terminal 1002 and the display device 1003 include, for example, an input interface 202, a CPU 203, a ROM 204, a display unit 205, a RAM 206, an external storage device 207, a communication unit 208, and a short-range wireless communication unit 209. The mobile terminal 1002 and the display device 1003 also include a speaker 210 and a microphone 211. These components are connected to each other by using, for example, an internal bus.

The CPU 203 is a system control unit and controls the device (mobile terminal 1002, display device 1003). The RAM 206 includes, for example, a Dynamic RAM (DRAM) or the like that requires a backup power source similar to the RAM 106. The RAM 206 is also used as a main memory and a work memory of the CPU 203. The ROM 204 stores fixed data such as control programs that the CPU 203 executes, a data table, or an OS program.

The communication unit 208 includes a similar function to that of the communication unit 108 described above and can wirelessly connect to another device via the access point 1005. The short-range wireless communication unit 209 is a device that performs short-range wireless communication with the short-range wireless communication unit 109 by using the same wireless communication method as that of the short-range wireless communication unit 109.

The speaker 210 outputs sound. For example, in a case where the mobile terminal 1002 is a smartphone, the speaker 210 outputs sound from a calling partner, sound data in a sound file of music or the like, various notification sound, or the like.

The microphone 211 inputs sound. For example, in a case where the mobile terminal 1002 is a smartphone, the microphone 211 inputs voice or the like of the user during calling. A sound analysis program is stored in the ROM 204 of the mobile terminal 1002 and the CPU 203 can convert the sound by the user, which is input to the microphone 211, into a document or issue a control command based on the sound by the user.

Figure 4A:
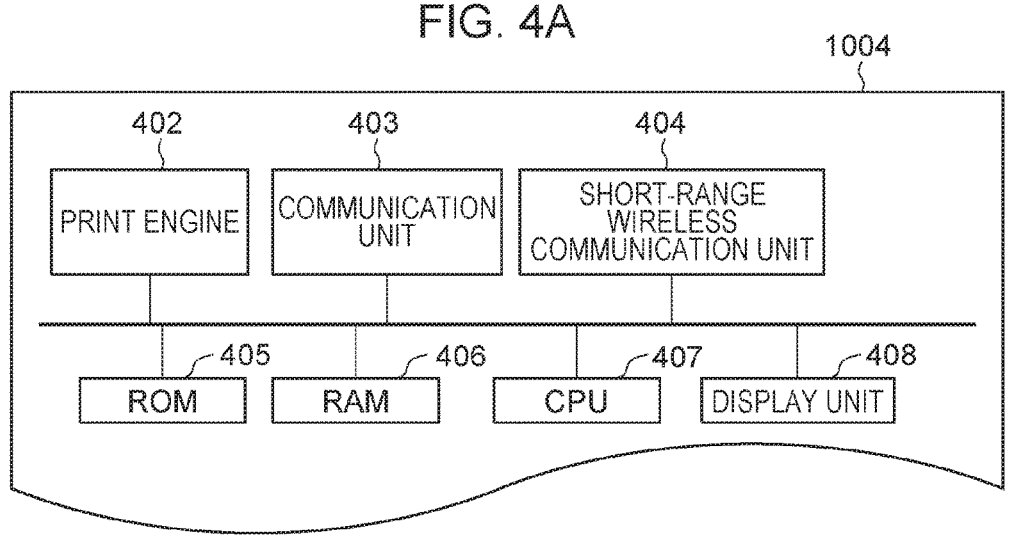
FIGS. 4A and 4B illustrate an example of a hardware configuration of each of a communication device and a server.

FIG. 4A illustrates a hardware configuration of the communication device 1004. The communication device 1004 includes, for example, a print engine 402, a communication unit 403, a short-range wireless communication unit 404, a ROM 405, a RAM 406, a CPU 407, and a display unit 408.

The CPU 407 is a system control unit and controls the communication device 1004. The RAM 406 includes, for example, a DRAM or the like that requires a backup power source similar to the RAM 106. The RAM 406 is used also as a main memory and a work memory of the CPU 407. The ROM 405 stores fixed data such as control programs that the CPU 407 executes, a data table, or an OS program.

The communication unit 403 includes a similar function to that of the communication unit 108 described above and can wirelessly connect to another device via the access point 1005. The short-range wireless communication unit 404 is a device that performs short-range wireless communication with the short-range wireless communication unit 109 by using the same wireless communication method as that of the short-range wireless communication unit 109.

The print engine 402 forms an image on a recording medium, such as a sheet of paper, by using a recording agent, such as ink, based on a print job received through the communication unit 403 and outputs a print result.

The display unit 408 is an interface for receiving a data input or an operation instruction from the user and is an operation panel including a physical keyboard, a button, a touch panel, and the like.

Figure 4B:
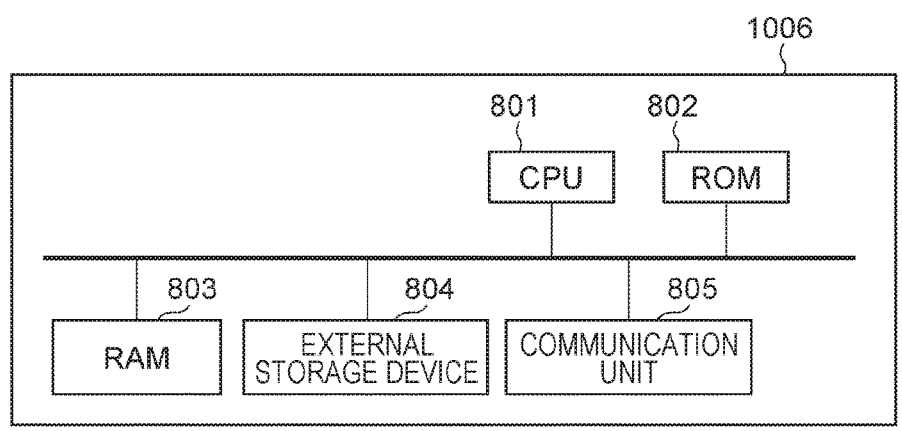

FIG. 4B illustrates a hardware configuration of the server 1006. The server 1006 includes a CPU 801, a ROM 802, a RAM 803, an external storage device 804, and a communication unit 805. The CPU 801 is a system control unit and controls the server 1006. While there is one server 1006 in the present embodiment, a server system corresponding to the server 1006 can be established by a plurality of information processing devices operating in cooperation with each other. The RUM 802 stores fixed data such as control programs that the CPU 801 executes, a data table, or an embedded OS program. The RAM 803 holds data by using a data backup primary battery (not illustrated), and can thus store data, such as a program control variable, without volatilizing the data. The external storage device 804 stores application software. The server 1006 generates print data in FIG. 7 described below. The external storage device 804 of the server 1006 stores print software that generates print data can be interpreted by the communication device 1004. The communication unit 805 includes a circuit and an antenna for performing communication based on a predetermined wireless communication method.

Figure 5:
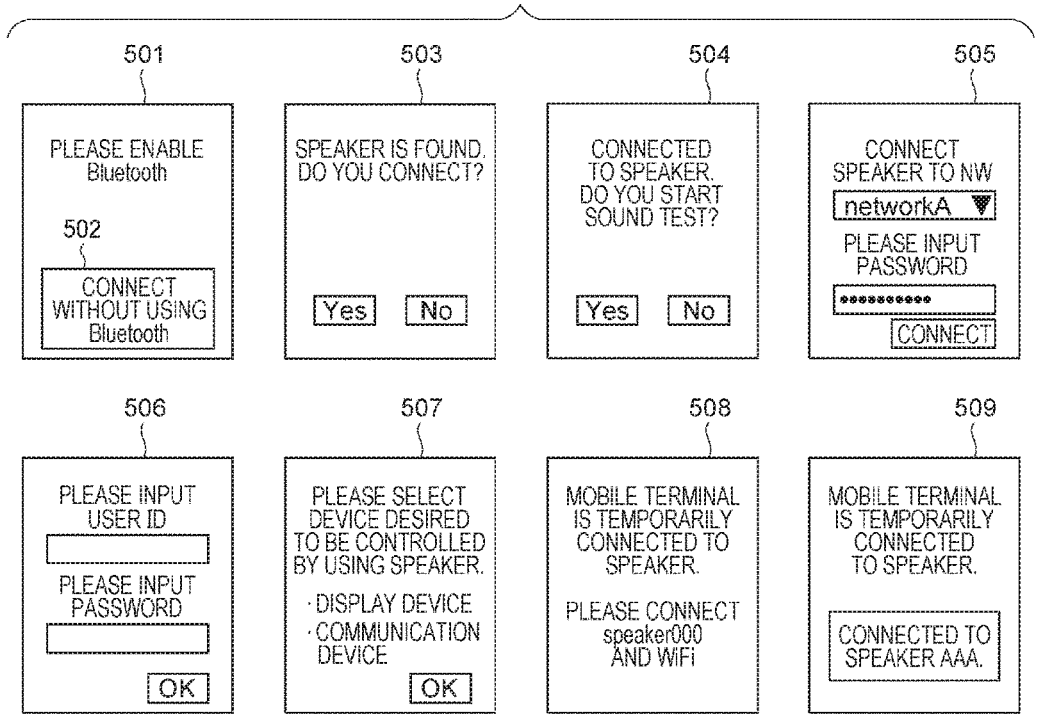
FIG. 5 illustrates an example of a screen related to setup of the sound control device.

Next, setup of the sound control device 1001 will be described. FIG. 5 illustrates an example of a screen that is displayed by the mobile terminal 1002 for setup of the sound control device 1001.

It is assumed that a management application for a sound control device is installed in advance in the mobile terminal 1002.

When the user activates the management application, a screen 501 is displayed on the display unit 205 of the mobile terminal 1002. Here, the user enables the short-range wireless communication unit 209 (for example, Bluetooth®) of the mobile terminal 1002 based on a message described on the screen 501. When the sound control device 1001 is activated, the sound control device 1001 issues a beacon including a specific identifier. In a case where the mobile terminal 1002 finds the beacon issued by the sound control device 1001 by using the management application, the mobile terminal 1002 displays a screen 503. In a case where a "Yes" button is pressed on the screen 503, the mobile terminal 1002 and the sound control device 1001 establish short-range wireless connection. In a case where the short-range wireless connection is established between the mobile terminal 1002 and the sound control device 1001, a screen 504 is displayed on the display unit 205 of the mobile terminal 1002. When the user presses a "Yes" button on the screen 504, sound data is transmitted from the mobile terminal 1002 to the sound control device 1001 through the short-range wireless connection and sound is output from the speaker 102 of the sound control device 1001. When the sound is output from the sound control device 1001, the user presses a "test complete button" displayed next to the screen 504, a screen 505 is displayed on the display unit 205 of the mobile terminal 1002.

The user inputs, on the screen 505, an SSID and a password of an access point (AP) to which the sound control device 1001 is to be connected. For example, when the sound control device 1001 is connected to an access point to which the mobile terminal 1002 is connected, the mobile terminal 1002 can perform communication with the sound control device 1001 via the access point. Thus, the user inputs, on the screen 505, an SSID and a password of the access point 1005 to which the mobile terminal 1002 is wirelessly connected by using the communication unit 208. When a connect button included in the screen 505 is pressed, the mobile terminal 1002 transmits the SSID and the password, which are input on the screen 505, to the sound control device 1001 via the short-range wireless connection. The sound control device 1001 uses the SSID and the password received via the short-range wireless connection and establishes wireless connection with the access point 1005. With the foregoing processing, the sound control device 1001 and the mobile terminal 1002 can perform wireless communication via the access point 1005.

Subsequently, the user inputs a user ID and a password for logging in to the server 1006 by using a screen 506 displayed in the mobile terminal 1002. The user ID and the password that are input on the screen 506 are transmitted from the mobile terminal 1002 to the sound control device 1001 via the short-range wireless connection or the access point 1005. The sound control device 1001 signs into the server 1006 by using the user ID and the password received from the mobile terminal 1002. At this time, the sound control device 1001 also transmits identification information (Mac address or the like) of the sound control device 1001. In a case where the user ID and the password received from the sound control device 1001 match ones registered in the server 1006 in advance, the server 1006 determines that authentication is successful and manages the identification information of the sound control device 1001 and the user ID in association with each other. Thereby, the sound control device 1001 can use service provided by the server 1006 to the user. The sound control device 1001 may receive an access token of the server 1006.

The user uses a screen 507 that is displayed next to the screen 506 and selects a device to be controlled by using the sound control device 1001. Here, it is assumed that the user selects the display device 1003 and the communication device 1004. A device displayed on the screen 507 is displayed when the mobile terminal 1002 searches for a device through the access point 1005. At this time, as a result of device search processing, the mobile terminal 1002 acquires a Mac address, an IP address, or the like of each device during the device search. Thus, in a case where an OK button is pressed on the screen 507, the mobile terminal 1002 transmits the Mac address or the IP address of each device to the sound control device 1001. By storing the Mac address or the IP address of each device, such as the communication device 1004, in the ROM 104 or the like and using the Mac address or the IP address for communication, the sound control device 1001 can perform access to each device or control of each device via the access point 1005. Additionally, the sound control device 1001 can also store identification information (Mac address or the like) of the mobile terminal 1002 in the ROM 104 or the like and perform control of the mobile terminal 1002 via the access point 1005.

Setup of the sound control device 1001 can be performed by using another method. For example, in a case where the sound control device 1001 is activated (or a setup mode is enabled), the communication unit 108 of the sound control device 1001 operates as a software AP. In a case where "connect without using Bluetooth" 502 is pressed on the screen 501, for example, the mobile terminal 1002 establishes wireless connection with the sound control device 1001 by using the communication unit 208. For example, there is a case where the communication unit 208 of the mobile terminal 1002 has already connected to the access point 1005. In such a case, the mobile terminal 1002 switches a connection destination of the communication unit 208 from the access point 1005 to the software AP of the communication unit 108 of the sound control device 1001 based on an operation of the user or an instruction of a management application. In a case where the wireless connection is established between the communication unit 208 of the mobile terminal 1002 and the communication unit 108 of the sound control device 1001, a screen 508 or a screen 509 is displayed. As subsequent processing, information input on the screen 505 is transmitted via the wireless connection established between the communication unit 208 of the mobile terminal 1002 and the communication unit 108 of the sound control device 1001. Then, the connection destination of the mobile terminal 1002 is switched to the access point 1005 in order for the mobile terminal 1002 and the sound control device 1001 to perform wireless communication via the access point 1005. The sound control device 1001 also disables the software AP and performs wireless connection with the access point 1005 by using the communication unit 108.

As described above, the sound control device 1001 can execute first reception processing for receiving information (SSID, password, or the like) about the external access point 1005 from the mobile terminal 1002 via wireless communication via the access point of the sound control device 1001. The sound control device 1001 can execute second reception processing for receiving information (SSID, password, or the like) about the external access point 1005 from the mobile terminal 1002 via short-range wireless communication. The sound control device 1001 can have any one or both of the two reception processing functions described above. The sound control device 1001 can be connected to the external access point 1005 by another reception processing function.

Next, processing for signing into the server 1006 by the communication device 1004 will be described. For example, the server 1006 that corresponds to the sound control device 1001 and a server 1007 that does not correspond to the sound control device 1001 exist on the Internet. For cooperation between the sound control device 1001 and the communication device 1004, the communication device 1004 needs to sign into the server 1006.

Figure 6:
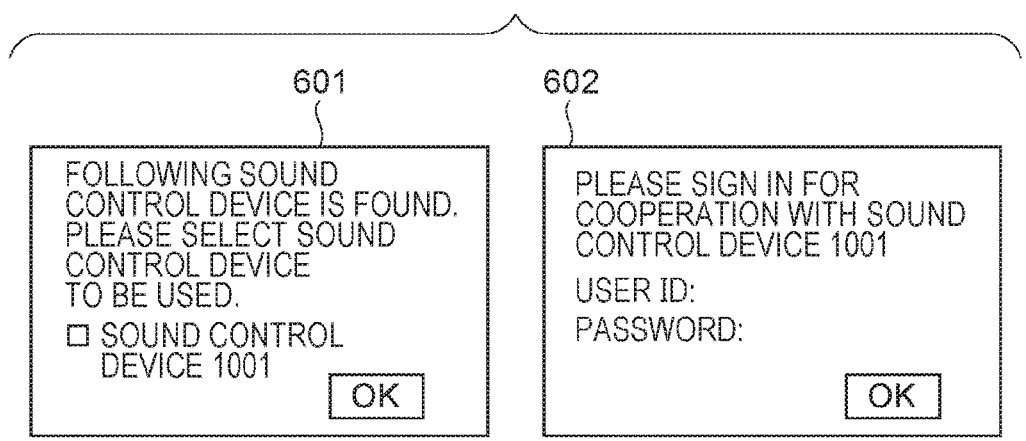
FIG. 6 illustrates an example of a screen displayed in the communication device.

The communication device 1004 includes a sound control device cooperation mode. In a case where the sound control device cooperation mode is enabled, the communication device 1004 performs device search in a network in which the communication device 1004 participates and finds a sound control device. A screen 601 of FIG. 6, in which the sound control device 1001 is selected, is displayed on the display unit 408 of the communication device 1004. The screen 601 of FIG. 6 is an example of display when only the sound control device 1001 is found. In a case where another sound control device is also found, a plurality of sound control devices are included in the screen 601, and the user can select a desired sound control device from the plurality of devices. In a case where the user selects a sound control device and presses an OK button on the screen 601, a screen 602 is displayed on the display unit 408 of the communication device 1004.

Information that is acquired by the device search includes, for example, a URL of the server 1006 that corresponds to the sound control device 1001. By using the URL, the communication device 1004 can display the screen 602 to sign into the server 1006. The communication device 1004 can sign into the server 1006 by using information input on the screen 602.

With the foregoing processing, the communication device 1004 can treat image data managed by the server 1006. When the sign-in of the communication device 1004 is completed, identification information (Mac address or the like) of the communication device 1004 is transmitted from the communication device 1004 to the server 1006. Then, in the server 1006, the identification information of the communication device 1004 is managed (stored) in association with a user ID input on the screen 602. In a case where a user ID input on the screen 506 and the user ID input on the screen 602 are the same, the server 1006 manages (stores) the user ID, the identification information of the communication device 1004, and the identification information of the sound control device 1001 in association with each other. The identification information of the sound control device 1001 is information transmitted to the server 1006 at the time of setup of the sound control device 1001.

In a case where a sound control device that corresponds to the server 1007 is found through the device search performed by the communication device 1004, the communication device 1004 displays a screen to sign into the server 1007.

Another processing can be performed as the processing in which the communication device 1004 signs in to the server 1006. An example of another processing will now be described. First, it is assumed that the mobile terminal 1002 is in a state of having signed into the server 1006. For example, it is assumed that the user signs into the server 1006 by using the screen 506 described above. In a case where the mobile terminal 1002 finds the communication device 1004 via the access point 1005, the mobile terminal 1002 displays the identification information of the communication device 1004 and a register button. For example, the register button can be displayed next to the communication device on the screen 507. In a case where the user presses the register button, a registration request is transmitted from the mobile terminal 1002 to the communication device 1004. The registration request includes destination information of the server 1006. When receiving the registration request, the communication device 1004 displays a selection screen, in which whether registration processing of the communication device 1004 is executed is selected, on the display unit 408 of the communication device 1004. When the user selects to execute the registration processing, the communication device 1004 transmits the registration request, which includes the Mac address of the communication device 1004, to the server 1006 based on the destination information included in the registration request. Then, the communication device 1004 receives, from the server 1006, a response to the registration request. The response includes a URL related to the registration processing of the communication device 1004. That is, the URL is a dedicated URL related to the registration processing of the communication device 1004. The communication device 1004 transmits, to the mobile terminal 1002, the response received from the server 1006. The mobile terminal 1002 transmits the registration request to the server 1006 by using the URL included in the received response. The registration request also includes a user ID and a password that have been input in the mobile terminal 1002 to sign into the server 1006. When the server 1006 having received the registration request receives a correct user ID and a correct password that are registered in advance, the server 1006 transmits, to the mobile terminal 1002, a response indicating that the registration request is successful. That is, since the server 1006 receives the registration request by using the dedicated URL related to the registration processing of the communication device 1004, the server 1006 temporarily registers the communication device 1004 as a printer for the user who has signed into the mobile terminal 1002 at that time. That is, the server 1006 manages (stores) the user ID and the Mac address of the communication device 1004 in association with each other. The mobile terminal 1002 transmits completion information indicating that registration is completed to the communication device 1004. When receiving the completion information, the communication device 1004 transmits, to the server 1006, the registration request that includes the Mac address of the communication device 1004. The server 1006 identifies a temporary registration state of the communication device 1004 and returns a registration completion response. The server 1006 formally registers the communication device 1004 as the printer for the user who has signed in to the mobile terminal 1002. In the formal registration, the server 1006 stores the identification information (Mac address or the like) of the communication device 1004 and the user ID in association with each other. When receiving the registration completion response from the server 1006, the communication device 1004 transmits information indicating registration completion to the mobile terminal 1002. With the foregoing processing, the communication device 1004 can treat image data managed by the server 1006.

Figure 7:
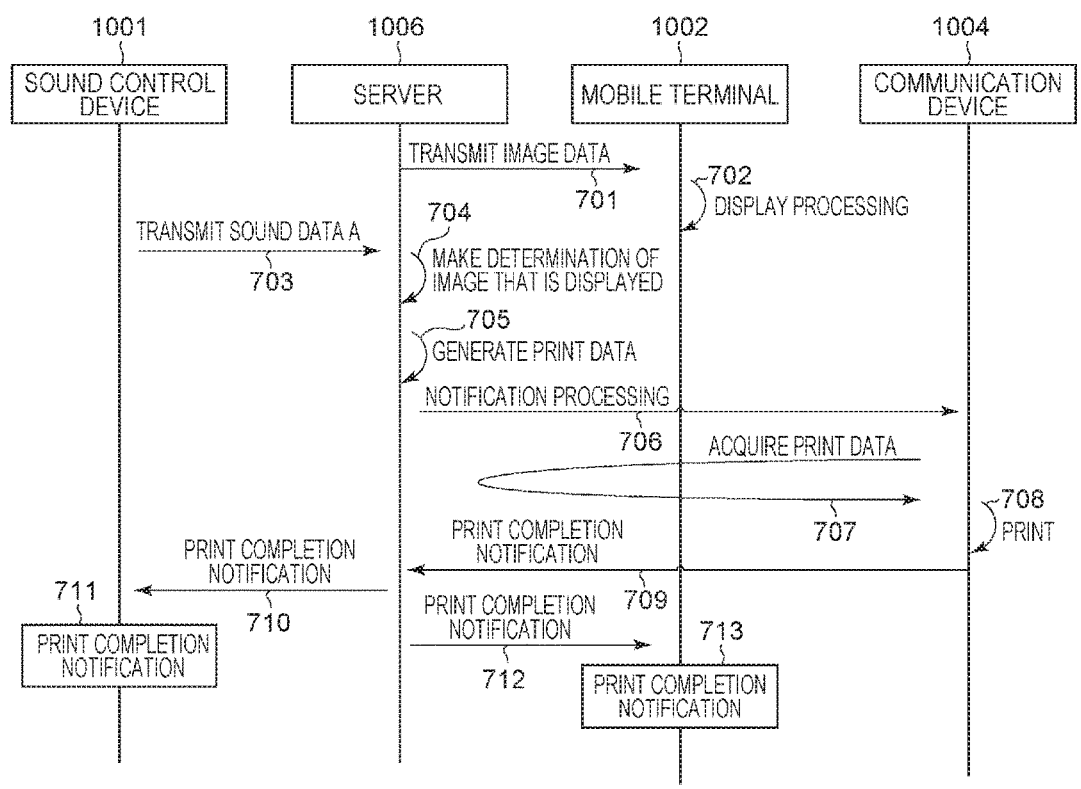
FIG. 7 is a sequence view for explaining an example of print processing executed by a print instruction provided by voice of a user to the sound control device.

FIG. 7 is a sequence view for explaining an example of print processing executed by a print instruction provided by voice of the user to the sound control device 1001. It is assumed that the mobile terminal 1002 has already signed into the server 1006. The sign-in of the mobile terminal 1002 is executed, for example, when the mobile terminal 1002 accesses the server 1006 via the Internet by using a Web browser or, for example, an application for photo storage service provided by the server 1006. For example, through the access, a Web page provided by the server 1006 is displayed on the display unit 205 of the mobile terminal 1002 by the Web browser, and when the user inputs a user ID and a password on the Web page, the sign-in is performed. The user ID and the password for the sign-in of the mobile terminal 1002 are the same as the user ID and the password for the sign-in of the communication device 1004 or the user ID and the password for the setup of the sound control device 1001. Thus, the server 1006 can perform processing by considering that the sound control device 1001, the mobile terminal 1002, and the communication device 1004 are used by the user of the same user ID. It is also assumed that image data corresponding to a picture A described below is saved for the user by the server 1006.

The mobile terminal 1002 acquires image data of the picture A stored in the server 1006 by a photo storage function provided by the server 1006 (701), and displays the picture A on the display unit 205 based on the acquired image data (702). The acquisition and display of the image data in the processing 701 and 702 are executed by a Web browser or a dedicated application of the mobile terminal 1002.

While in the vicinity of the sound control device 1001, the user first speaks a wake word that is a predetermined keyword and then what the user desires to perform. For example, the user speaks "make the communication device 1004 print the picture A displayed in the mobile terminal 1002" after the wake word.

The sound control device 1001 inputs the sound of the wake word and inputs sound that is spoken after the wake word. That is, the sound control device 1001 inputs sound of "make the communication device 1004 print the picture A displayed in the mobile terminal 1002".

The sound control device 1001 transmits, to the server 1006, the identification information (for example, Mac address or the like) of the sound control device 1001 and sound data based on the input sound (703). Description is provided here by assuming that sound data corresponding to the sound "make the communication device 1004 print the picture A displayed in the mobile terminal 1002" is sound data A.

The server 1006 analyzes the sound data transmitted from the sound control device 1001 and determines that the sound data is the sound data A. When such determination is performed, the server 1006 specifies, from the Mac address of the sound control device 1001, a user ID associated with the Mac address and thereby recognizes that the sound control device is a device that has completed sign-in. The access token described above can be used.

The server 1006 analyzes the sound data transmitted from the sound control device 1001 and executes processing based on the sound data. The server 1006 has received the sound data of the sound "print the picture A displayed in the mobile terminal 1002". Thus, the server 1006 makes determination of an image that is displayed for the user ID corresponding to the sound control device 1001 (704). In this case, it is determined that the picture A is displayed. The server 1006 then generates print data based on the image data corresponding to the picture A (705). Note that, as the processing 705, a server different from the server 1006 can generate the print data. For example, a manufacturer of the communication device 1004 provides a printing server including software for generating print data. Then, the server 1006 can request the printing server to generate print data and the printing server can generate the print data.

When the generation of the print data is completed, the server 1006 transmits notification indicating that the generation of the print data is completed to the communication device 1004 (706).

When receiving the notification indicating that the generation of the print data is completed, the communication device 1004 accesses the server 1006 to acquire the print data and execute printing (707, 708).

When the print processing is completed, the communication device 1004 transmits print completion notification to the server 1006 (709) and the server 1006 transmits the print completion notification to the sound control device 1001 (710).

When receiving the print completion notification, the sound control device 1001 notifies print completion by sound (711).

In a case where the sound control device 1001 can specify a name of a user who requests printing from the voice of "print the picture A displayed in the mobile terminal 1002", the sound control device 1001 can generate sound data with the user name added. Through such processing, the communication device 1004 can display the user name as a user executing the print processing 708 or as a print history.

After the print completion is notified and before printing using another print data is instructed, the user first speaks a wake word and then what the user desires to perform in the vicinity of the sound control device 1001. For example, after the wake word, the user speaks an instruction to add the number of copies like "one more copy" or "print three more copies".

The sound control device 1001 receiving the instruction to add the number of copies can transmit the sound data, which is transmitted in the processing 703, again. Sound data corresponding to "one more copy" or "print three more copies" is also transmitted together. By receiving these two pieces of sound data, the server 1006 performs processing for generating print data similar to the processing 705. Then, the server 1006 sets the number of copies based on sound data as a new request. Such processing enables the user to easily instruct re-printing using the same image data. After the print completion is notified and before printing using another print data is instructed, the user first speaks the wake word and then what the user desires to perform in the vicinity of the sound control device 1001. For example, after the wake word, the user speaks "print on a larger sheet".

Upon such an instruction, the sound control device 1001 can transmit the sound data, which is transmitted in the processing 703, again. Note that, sound data corresponding to "print on a larger sheet" is also transmitted together. By receiving these two pieces of sound data, the server 1006 performs processing for generating print data similar to the processing 705. Then, the server 1006 sets a sheet size based on sound data as a new request. Such processing enables the user to easily instruct printing of the same image data on a sheet with a different size. In a case where another device generates print data as described below, the device that generates the print data can perform similar processing.

Through the processing illustrated in FIG. 7, the user can cause the communication device 1004 to print the image displayed in the mobile terminal 1002 by a print instruction provided by sound to the sound control device 1001. However, the processing of FIG. 7 is performed under a condition that the communication device 1004 signs into the server 1006 and the server 1006 and the communication device 1004 communicate with each other.

Then, processing for causing the communication device 1004 to print an image displayed in the mobile terminal 1002 by a print instruction provided by sound to the sound control device 1001 even when the communication device 1004 does not communicate with the server 1006 will be described in FIG. 8. Specifically, processing in which the mobile terminal 1002 transmits print data to the communication device 1004 not via the server 1006 by a print instruction to the sound control device 1001 will be described.

Figure 8:
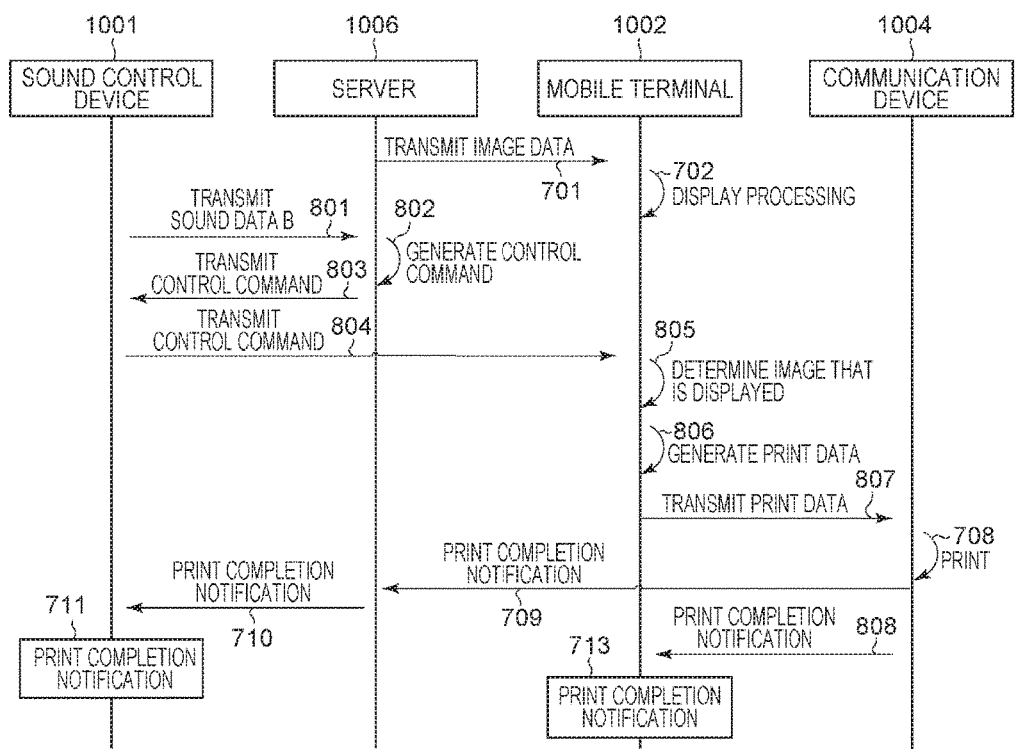
FIG. 8 is a sequence view for explaining another example of print processing executed by a print instruction provided by voice of the user to the sound control device.

FIG. 8 is a sequence view for explaining another example of print processing executed by a print instruction provided by voice of the user to the sound control device 1001. At a step of the display processing 702, the identification information (Mac address or the like) of the mobile terminal 1002 is stored in the server 1006 in association with a user ID. Alternatively, before the processing of FIG. 8, the identification information (Mac address or the like) of the mobile terminal 1002 is stored in the sound control device 1001. Processing with the same reference numbers as that in FIG. 7 is similar to the processing in FIG. 7, so that detailed description thereof will be omitted.

While an image is displayed in the mobile terminal 1002 by the processing 702, the user speaks a wake word in the vicinity of the sound control device 1001. Then, the user speaks "make the communication device 1004 print the picture A displayed in the mobile terminal 1002" to the sound control device 1001.

The sound control device 1001 transmits, to the server 1006, the identification information (for example, Mac address or the like) of the sound control device 1001 and sound data based on the received sound (801). Description will be provided by assuming that sound data indicating that a printing source is a mobile terminal as in "make the communication device 1004 print the picture A displayed in the mobile terminal 1002" is sound data B.

The server 1006 analyzes the sound data transmitted from the sound control device 1001 and detail tines that the sound data is the sound data B. When such determination is performed, the server 1006 generates a control command based on the sound data and transmits the control command to the sound control device 1001 (802, 803). The control command includes a print processing command as details of processing to be executed, identification information (file name or the like) corresponding to the picture A serving as a print target, the identification information (Mac address or the like) of the mobile terminal 1002, and the identification information (Mac address or the like) of the communication device 1004. The server 1006 can specify a user ID from the identification information of the sound control device 1001.

Then, the server 1006 can specify the identification information of the mobile terminal 1002 and the identification information of the communication device 1004 from the specified user ID and generate the control command described above. In a case where the identification information of the mobile terminal 1002 is stored in the sound control device 1001, the control command may not include the identification information of the mobile terminal 1002.

The sound control device 1001 selects a transmission target of the control command received from the server 1006. Since the user speaks to the "mobile terminal 1002" as a request from the user and the control command from the server 1006 includes the identification information of the mobile terminal 1002, the sound control device 1001 selects the mobile terminal 1002 as a transmission destination. The sound control device 1001 transmits the control command to the selected mobile terminal 1002 (804).

The mobile terminal 1002 executes processing based on the control command. Specifically, first, the mobile terminal 1002 determines an image (picture A) that is displayed from identification information (file name or the like) of a picture included in the control command (805). The mobile terminal 1002 then acquires the image (picture A) that is displayed from a memory of the mobile terminal 1002, such as the RAM 206, and generates print data (806). Note that, in a case where an image with a small number of pixels, such as a thumbnail image of the picture A, is displayed, the mobile terminal 1002 can access the server 1006 and acquire an image with a large number of pixels in the processing 806.

Based on the identification information of the communication device 1004 that is included in the control command, the mobile terminal 1002 transmits the print data generated in the processing 806 to the communication device 1004 (807). As the processing 807, the mobile terminal 1002 searches for a device connected to the access point 1005, for example, by the identification information (Mac address or the like) of the communication device 1004. In a case where there is a response from the device corresponding to the identification information (in a case where the device is detected), the mobile terminal 1002 determines that the device is the communication device 1004 and performs connection by a wireless LAN and transmission of the print data.

The communication device 1004 performs printing based on the print data transmitted in the processing 807 (708) and performs print completion notification to the server 1006 and the mobile terminal 1002 (709, 808). When the communication device 1004 does not sign into the server 1006, the processing 709 is not performed.

According to the processing illustrated in FIG. 8, the user provides a print instruction of "make the communication device 1004 print the picture A displayed in the mobile terminal 1002" corresponding to the sound data B. Thereby, the print data of the picture A that is displayed in the mobile terminal 1002 can be transmitted to the communication device 1004 without using the server 1006 for printing.

The control command may not include the identification information (file name or the like) of the picture A or the identification information (Mac address or the like) of the communication device 1004 in FIG. 8. In such a case, it is assumed that an image and a printer are selected by a dedicated application of the mobile terminal 1002. When receiving the control command, the mobile terminal 1002 generates print data of the image that is selected by the dedicated application and transmits the print data to the selected printer for printing. That is, by providing a print instruction corresponding to the sound data B to the sound control device 1001 while the image and the printer are selected in advance, the user can cause the selected printer to print the selected image.

Figure 9:
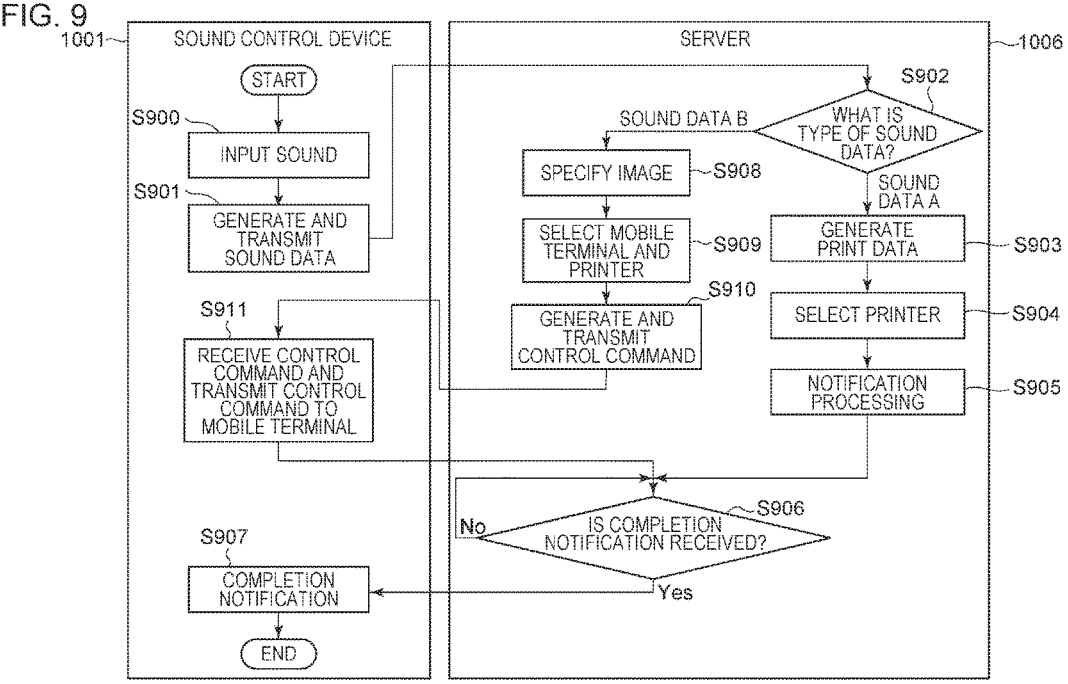
FIG. 9 is a flowchart illustrating an example of processing of the sound control device and the server.

Next, processing of the sound control device 1001 and the server 1006 will be described with reference to FIG. 9. In a flowchart of FIG. 9, when the CPU 103 reads a program related to the processing of the flowchart from a memory and executes the program, the processing of the sound control device 1001 is executed. When the CPU 801 reads a program related to the processing of the flowchart from a memory and executes the program, the processing of the server 1006 is executed.

The CPU 103 inputs a word (sound) uttered by the user in the vicinity of the sound control device 1001 (S900) and generates sound data based on the input sound. Then, the sound data is transmitted from the sound control device 1001 to the server 1006 (S901). The identification information (Mac address) of the sound control device 1001 is also transmitted to the server 1006 at S901.

When receiving the sound data, the CPU 801 analyzes the sound data and determines whether a type of the sound data is the sound data A or the sound data B described above (S902). The type of the sound data is not limited to two types, and there can be various kinds of sound data, including sound data to instruct processing of display or the like other than printing.

When determining that the type of the received sound data is the sound data A at S902, the CPU 801 executes processing (S903 to S905) corresponding to the processing 704 to 706 of FIG. 7. Specifically, the CPU 801 specifies image data corresponding to the picture A displayed in the mobile terminal 1002 and generates print data based on the image data (S903). Print setting information used for the generation of the print data at S903 is print setting information that is set in advance for printing using the server 1006.

The CPU 801 then selects a printer to execute print processing (S904). The CPU 801 specifies a user ID associated with the Mac address of the sound control device 1001, which is received at S901. When the server 1006 specifies the communication device 1004 that is managed in association with the user ID, the processing of S904 is realized.

The CPU 801 transmits notification indicating that the generation of the print data is completed to the printer (communication device 1004) that is selected at S904 (S905). After that, the CPU 801 determines whether print completion notification is received from the communication device 1004 (S906). In a case where the print completion notification is received from the communication device 1004 at S906, the CPU 801 transmits the print completion notification to the sound control device 1001 serving as a print instruction source (S907).

When receiving the print completion notification, the CPU 103 notifies print completion by sound. Specifically, the CPU 103 converts the print completion notification into sound and outputs the print completion by sound using the speaker 102.

When determining that the type of the received sound data is the sound data B at S902, the CPU 801 executes processing (S908 to S910) corresponding to the processing 802 and 803 of FIG. 8. Specifically, the CPU 801 specifies a user ID associated with the Mac address of the sound control device 1001 and specifies an image that is displayed for the user ID (S908). Next, the mobile terminal 1002 and a printer to execute the print processing are selected (S909). The CPU 801 specifies the user ID associated with the Mac address of the sound control device 1001, which is received at S901, and selects a mobile terminal corresponding to the user ID. The selection of the printer is similar to h processing at S904. Next, the CPU 801 generates a control command based on the sound data and transmits the control command to the sound control device 1001 (S910). The control command includes a print processing command as details of processing to be executed, identification information (file name or the like) corresponding to the image specified at S908, and the identification information (Mac address or the like) of the mobile terminal 1002 and the communication device 1004 which are selected at S909.

The CPU 103 of the sound control device 1001 receives the control command and transmits the control command to the mobile terminal 1002 based on the identification information of the mobile terminal that is included in the control command (S911). The processing of S911 corresponds to the processing 804 of FIG. 8.

With the foregoing processing, since the user can provide a print instruction by speaking to the sound control device 1001, the user can print a desired picture with a simple operation. When the user differentiates content of a print instruction (a type of sound data) as described in FIGS. 7 to 9, print data can be transmitted to the communication device 1004 in different communication paths. Specifically, it is possible to switch a communication path between a communication path in which the print data is transmitted from the server 1006 to the communication device 1004 (FIG. 7) and a communication path in which the print data is transmitted from the mobile terminal 1002 without through the server 1006 (FIG. 8).

The sound data A and the sound data B as the type of sound data are not limited to the aforementioned examples and various sound data can be used. That is, sound data of various contents (words) can be adopted as long as a characteristic of sound is registered in advance in the server 1006 and the server 1006 can discriminate the type of sound data. For example, sound data indicating content, such as "print the picture A that is displayed through a cloud", can be adopted as the sound data A and sound data indicating content, such as "locally print the picture A that is displayed", can be adopted as the sound data B.

Though description has been provided by taking the Mac address as an example of the identification information of the mobile terminal 1002 and the communication device 1004, various information such as an IP address or a device name can be adopted.

(Second Embodiment)

An example in which the user provides a print instruction to the sound control device 1001 by sound is indicated in FIGS. 7 and 8 described above. Next, processing in which the user provides a print instruction to the microphone 211 of the mobile terminal 1002 by sound will be described.

Figure 10A:
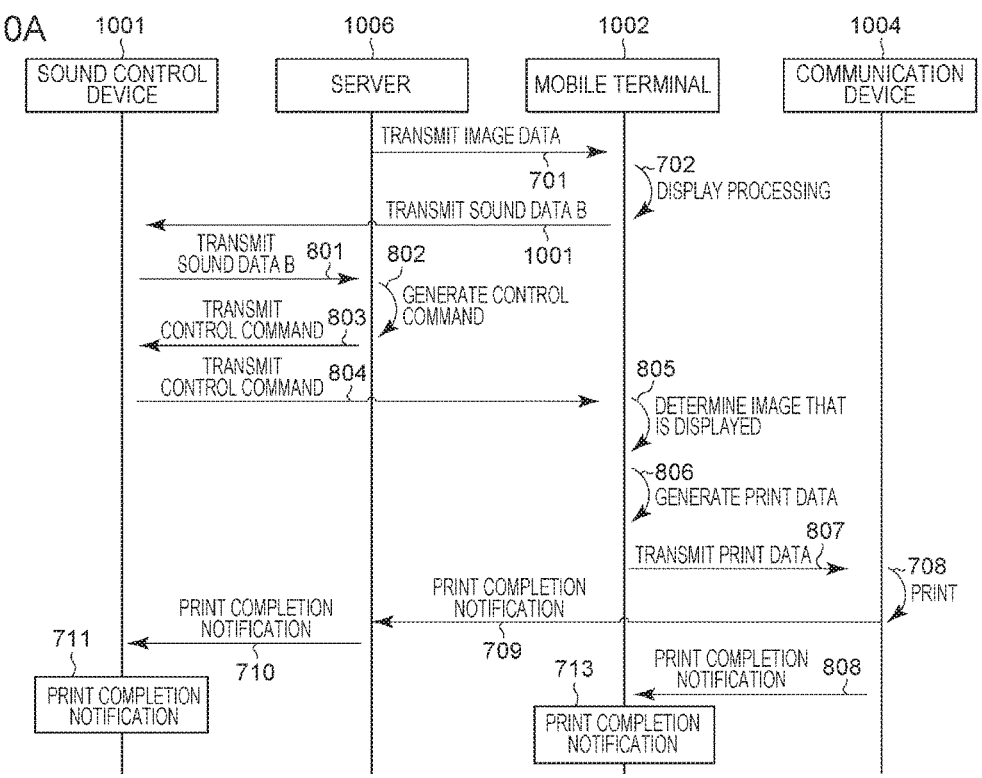

FIGS. 10A and 10B are sequence views for describing an example of print processing executed by a print instruction provided by voice of the user to the mobile terminal 1002. Processing similar to that in FIG. 8 described above includes the same reference numbers and detailed description thereof will be omitted. it is assumed that the mobile terminal 1002 and the sound control device 1001 are connected such that they rocognize each other via the access point 1005 and communicate with each other.

FIG. 10A illustrates processing in which the user provides a print instruction by sound (sound data B) to the mobile terminal 1002 and the mobile terminal 1002 causes the communication device 1004 to execute printing by a control command from the sound control device 1001. FIG. 10A is different from FIG. 8 in that the user provides a print instruction to the mobile terminal 1002 by sound. The print instruction is provided, for example, by sound ("make the communication device 1004 print the picture A displayed in the mobile terminal 1002") corresponding to the sound data B described above. The mobile terminal 1002 transmits the sound data B to the sound control device 1001 as processing 1001. After that, similar to the processing described in FIG. 8, the sound control device 1001 transmits a control command to the mobile terminal 1002 via the server 1006, the mobile terminal 1002 generates print data and transmits the print data to the communication device 1004, and the communication device 1004 executes printing.

According to the processing illustrated in FIG. 10A, the user can provide a print instruction by voice to the mobile terminal 1002. Thus, in a case where the user is in a place remote from the sound control device 1001 when viewing a picture in the mobile terra 1002, for example, the user can provide a print instruction by voice without approaching the sound control device 1001. The mobile ten deal 1002 transmits sound data to the sound control device 1001. Accordingly, even when the mobile terminal 1002 itself does not have a function of generating a control command for a print instruction from sound data, it is possible to cause the communication device 1004 to execute printing by a print instruction by sound.

The processing illustrated in FIG. 10A and the processing illustrated in FIG. 8 can be realized at the same time. That is, the user can provide a print instruction by voice to the mobile terminal 1002 and the sound control device 1001. Thus, the sound control device 1001 waits in a state of enabling both acquisition of sound data by inputting sound and receipt of the sound data from the mobile terminal 1002. Both the processing illustrated in FIG. 8 and the processing illustrated in FIG. 10A can be realized by transmitting the sound data to the server 1006.

FIG. 10B illustrates processing in which the user provides a print instruction by sound to the mobile terminal 1002 and the mobile terminal 1002 causes the communication device 1004 to execute printing without using the sound control device 1001. Similar to the case of FIG. 10A, when a picture is displayed in the processing 805, the sound of the print instruction is input to the mobile terminal 1002. However, unlike FIG. 10A, even when receiving the print instruction by the sound, the mobile terminal 1002 does not transmit the sound data to the sound control device 1001, but specifies the communication device 1004 by the mobile terminal 1002 itself and transmits print data.

The processing in FIG. 10B is enabled when the communication device 1004 is registered in the mobile terminal 1002. When the communication device 1004 is registered in the mobile terminal 1002, for example, by an application for printing, the identification information (Mac address, IP address, or the like) of the communication device 1004 is registered by the application. In such a state, the mobile terminal 1002 can transmit the print data to the communication device 1004 without receiving a control command from the sound control device 1001.

Thus, based on whether the communication device 1004 is registered (registered in the application for printing, for example), the mobile terminal 1002 switches the processing in FIG. 10A and the processing in FIG. 10B.

Figure 11:
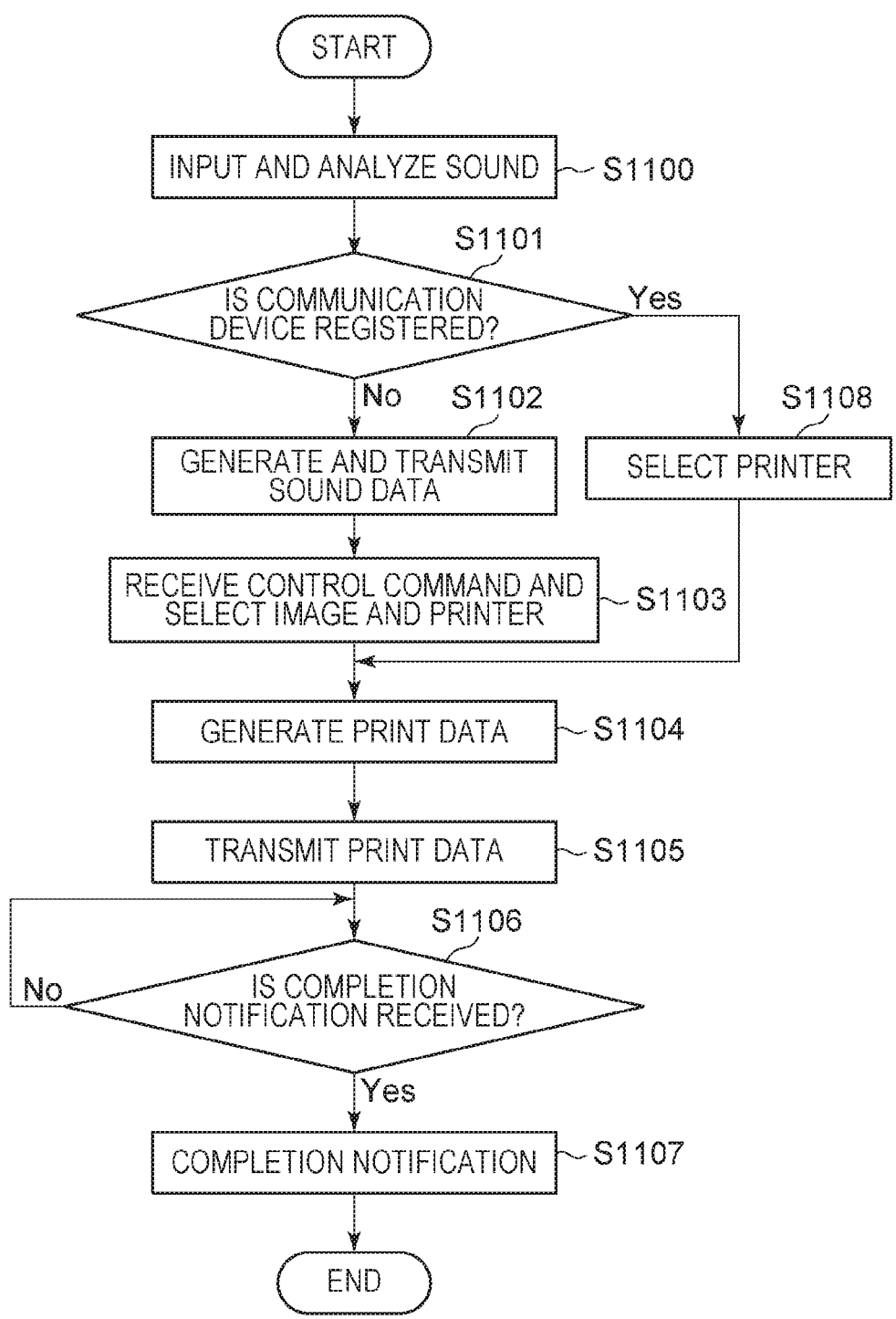
FIG. 11 is a flowchart illustrating an example of processing of the mobile terminal.

FIG. 11 is a flowchart illustrating processing by the mobile terminal 1002. A program corresponding to the processing illustrated in the flowchart of FIG. 11 is stored in the ROM 204 of the mobile terminal 1002. When the CPU 203 of the mobile terminal 1002 executes the program on the RAM 206, the processing illustrated in the flowchart of FIG. 11 is executed. The processing illustrated in FIG. 11 is executed when an image transmitted from the server 1006 is displayed in the mobile terminal 1002.

The CPU 203 inputs a word (sound) uttered by the user in the vicinity of the mobile terminal 1002 and analyzes content thereof (S1100). It is assumed that a word (sound) corresponding to a print instruction to cause the communication device 1004 to print an image that is displayed is input. While not described, in a case where a word (sound) corresponding to an instruction of another processing to the mobile terminal 1002 is input, processing according to the instruction is performed.

In a case where it is determined that a print instruction to cause the communication device 1004 to print the image that is displayed is provided as a result of the analysis of S1100, the CPU 203 determines whether the communication device 1004 is registered in the mobile terminal 1002 at S1101. For example, whether the identification information (Mac address, IP address, or the like) of the communication device 1004 is stored in an area assigned to a print application in the ROM 204 of the mobile terminal 1002 is determined.

In a case where it is determined at S1101 that the communication device 1004 is not registered, the CPU 203 generates sound data based on the sound input at S1100 and transmits the sound data to the sound control device 1001 (S1102). The processing of S1102 corresponds to the processing 1001 of FIG. 10A. After that, the CPU 203 receives a control command from the sound control device 1001 (S1103). The processing of S1103 corresponds to the processing 804 of FIG. 10A.

Next, the CPU 203 analyzes the received control command and specifies processing to be executed after that. The control command includes the print instruction for the image that is displayed, identification information (file name or the like) of the image, and the identification information (Mac address or the like) of the communication device 1004. The CPU 203 selects the image that is displayed from the identification information of the image and selects, as a printer that is caused to execute printing, the communication device 1004 from the identification information of the communication device 1004 (S1103). Then, the CPU 203 acquires the displayed image that is selected at S1103 from a memory of the mobile terminal 1002, such as the RAM 206, and generates print data (S1104). At S1104, the print data is generated by using print setting information that is set in advance as described above. In a case where an image with a small number of pixels, such as a thumbnail image, is displayed, the mobile terminal 1002 accesses the server 1006 and acquires an image with a large number of pixels. The processing of S1103 and S1104 corresponds to the processing 805 and 806 of FIG. 10A, respectively.

Next, the CPU 203 transmits the print data generated at S1104 to the communication device 1004 (S1105). The CPU 203 determines whether print completion notification is received (S1106), and when the print completion notification is received, the CPU 203 notifies completion of printing by sound (S1107). The processing of S1105 to S1107 corresponds to the processing of 807, 808, and 713 of FIG. 10A.

In a case where it is determined at S1101 that the communication device 1004 is registered, the CPU 203 selects the communication device 1004 as the printer that is caused to execute printing (S1108). At S1105, the print data is transmitted based on the identification information of the communication device 1004 that is included in the control command when the processing of S1103 is executed, or based on the identification information of the communication device 1004 registered in the mobile terminal 1002 in advance when the processing of S1108 is executed.

With the foregoing processing, the user can print a desired picture with a simple operation. When the communication device 1004 is registered in the mobile terminal 1002, printing can be performed without using the sound control device 1001, so that printing can be executed more promptly. Even when the communication device 1004 is not registered in the mobile terminal 1002, it is possible to cause the communication device 1004 to execute printing via the sound control device 1001. Whether to use the sound control device 1001 for printing is automatically determined by the processing indicated in S1101. Thus, the user can cause the communication device 1004 to execute printing without recognizing a registration state of the communication device 1004 when giving a print instruction by uttering voice to the mobile terminal 1002.

While an example in which the mobile terminal 1002 performs generation and transmission of print data has been described in FIGS. 10A and 10B, the sound control device 1001 can perform generation and transmission of print data.

Figure 12B:
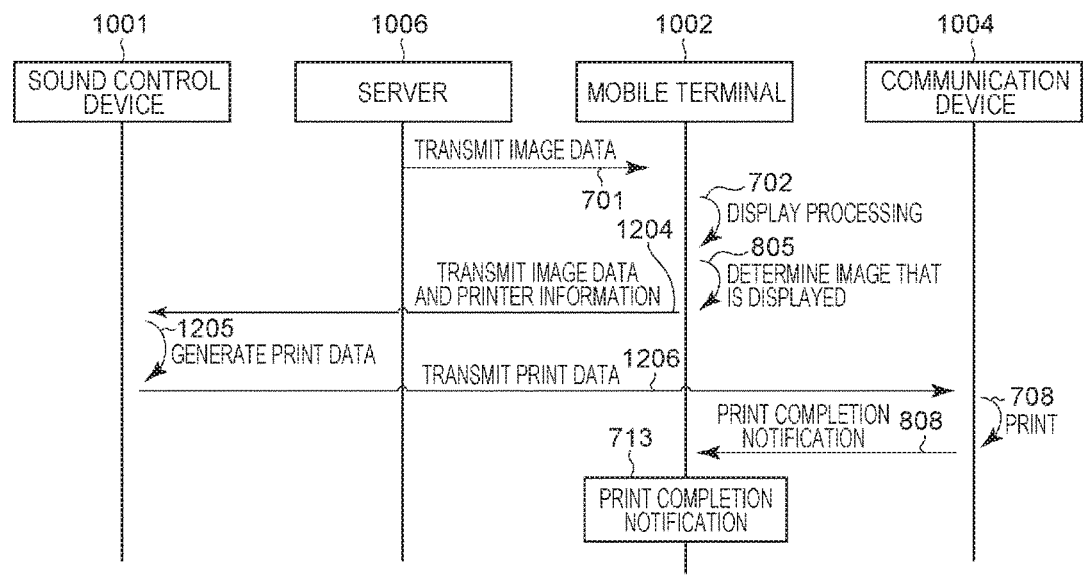

FIGS. 12A and 12B are sequence views for explaining another example of print processing executed by a print instruction provided by voice of the user to the mobile terminal 1002. Processing similar to that in FIGS. 10A and 10B described above includes the same reference numbers and detailed description thereof will be omitted. It is assumed that the mobile terminal 1002 and the sound control device 1001 are connected and the communication device 1004 and the sound control device 1001 are connected such that they recognize each other via the access point 1005 and communicate with each other.

FIG. 12A illustrates processing in which the server 1006 issues a control command corresponding to sound data and the mobile terminal 1002 transmits image data that is displayed to the sound control device 1001 in response to the control command. As processing 1200, the server 1006 generates a control command that includes an instruction to transmit the image that is displayed, identification information (file name or the like) of the image that is displayed, and the identification information (Mac address or the like) of each of the sound control device 1001 and the communication device 1004.

When receiving the control command by the processing 804, the mobile terminal 1002 acquires the image that is displayed from a memory of the mobile terminal 1002, such as the RAM 206. Then, based on the identification information of the sound control device 1001 that is included in the control command, the mobile terminal 1002 transmits image data to the sound control device 1001 (1201). In a case where an image with a small number of pixels, such as a thumbnail image of the picture A, is displayed, the mobile terminal 1002 may access the server 1006 and acquire an image with a large number of pixels in the processing 806.

The sound control device 1001 generates print data based on the received image data (1202). Then, the sound control device 1001 transmits the print data to the communication device 1004 based on the identification information of the communication device 1004 that is included in the control command received by the processing 803. In a case where the identification information of the communication device 1004 is stored in the sound control device 1001, the control command may not include the identification information of the communication device 1004.

FIG. 12B illustrates processing in which the mobile terminal 1002 transmits the identification information of the communication device 1004 to the sound control device 1001. When the mobile terminal 1002 receives the image that is displayed in the processing 805, the mobile terminal 1002 transmits, to the sound control device 1001, image data of the image and the identification information (printer information) of the communication device 1004 that is registered in the mobile terminal 1002 (1204). The sound control device 1001 generates print data based on the image data received by the processing 1204 (1205). Then, based on the identification information (printer information) of the communication device 1004 received by the processing 1204, the sound control device 1001 transmits the print data generated by the processing 1205 to the communication device 1004 (1206).

The processing illustrated in FIG. 12A and the processing illustrated in 12B as described above can be executed instead of that in FIG. 10A and that in FIG. 10B, respectively. Thus, for example, the mobile terminal 1002 can execute the processing of FIG. 12A and the processing of FIG. 12B in a switching manner based on a result of the determination processing at S1101 illustrated in FIG. 11.

(Third Embodiment)

Setup processing in which the communication device 1004 executes print processing based on a print instruction by sound input to a sound control device will now be described. The setup processing is executed in advance before the processing illustrated in FIGS. 7, 8, 9, 10A, 10B, 11, 12A, and 12B.

First, various types of sound control devices will be described with an example. For example, in a case where printing is performed by using a sound control device 1001 of a company A, a server A corresponding to the sound control device 1001 generates print data. That is, the printing is executed by the processing illustrated in FIG. 7. A screen on which a user ID and a password for the communication device 1004 to access the server A are can be displayed.

In a case where printing is performed by using a sound control device 1001 of a company B, a server B corresponding to the sound control device 1001 generates print data. That is, the printing is executed by the processing illustrated in FIG. 7. Moreover, an invitation page for the communication device 1004 to access the server B is printed.

In a case where printing is performed by using a sound control device 1001 of a company C, a server C corresponding to the sound control device 1001 generates print data. That is, the printing executed by the processing illustrated in FIG. 7. The mobile terminal 1002 receives an operation for the communication device 1004 to access the server C.

In a case where printing is performed by using a sound control device 1001 of a company D, the sound control device 1001 generates print data. That is, the printing is executed by the processing illustrated in FIGS. 12A and 12B. In this case, the communication device 1004 does not need to cooperate with a server.

In a case where printing is performed by using a sound control device 1001 of a company E, a server E corresponding to the sound control device 1001 generates print data. That is, the printing is executed by the processing illustrated in FIG. 7. A screen on which a user ID and a password for the communication device 1004 to access the server E are set can be displayed. A table of FIG. 15, in which features as described above are summarized, is stored by the communication device 1004.

Figure 13:
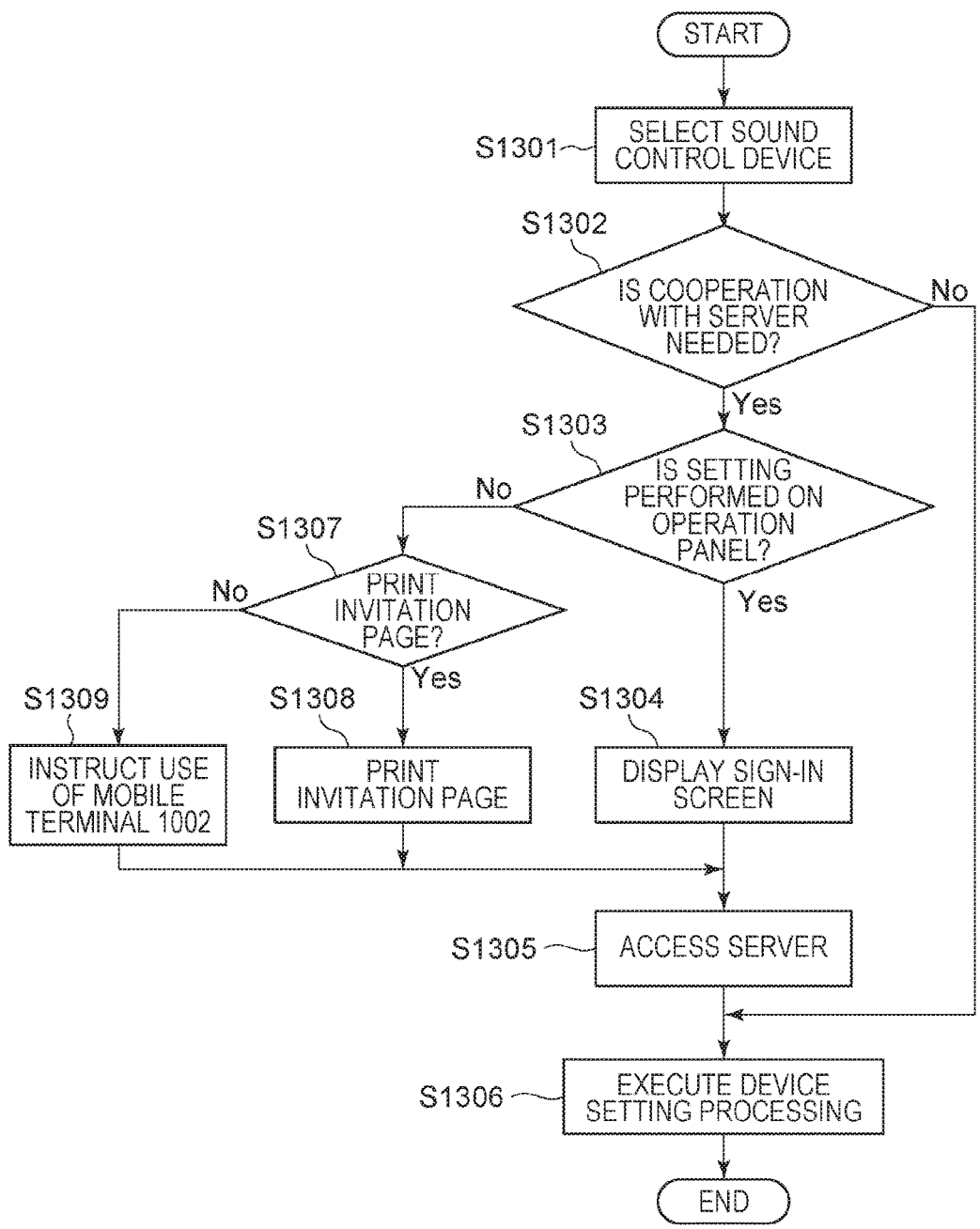
FIG. 13 is a flowchart illustrating an example of processing of the communication device.

Next, processing of the communication device 1004 will be described with reference to FIG. 13.

Figure 14:
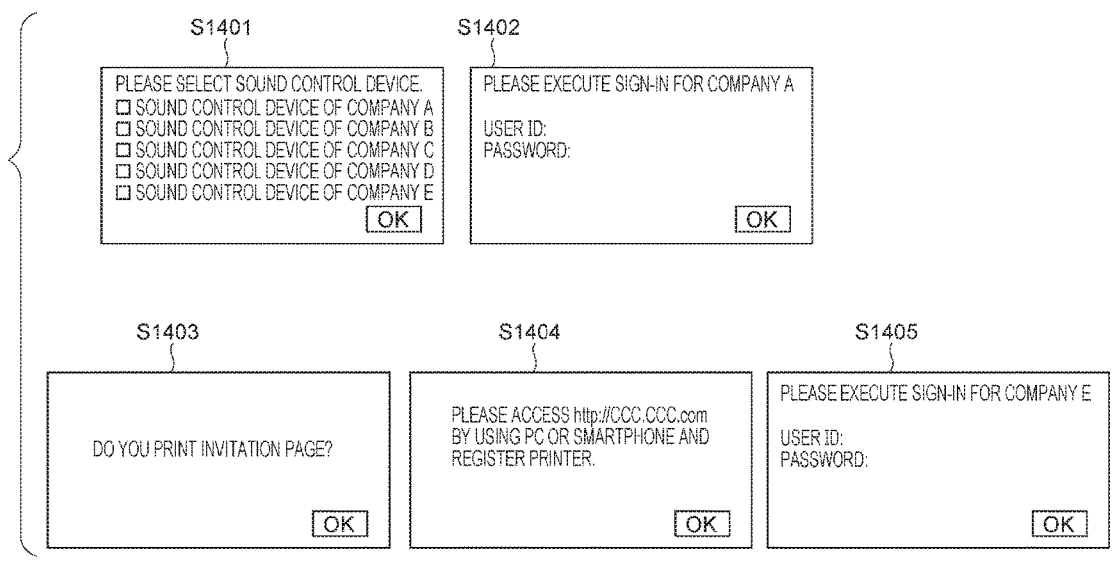
FIG. 14 illustrates an example of a screen displayed in the communication device.

First, in a case where the user instructs cooperation between a sound control device and the communication device 1004, the CPU 407 displays a selection screen 1401 of the sound control device to be cooperated with the communication device 1004 (S1301). FIG. 14 illustrates an example of a screen related to the setup of the communication device 1004.

The CPU 407 determines whether cooperation with a server is required based on the sound control device that is selected on the selection screen 1401 (S1302). For example, the communication device 1004 makes the determination of S1302 by using the table of FIG. 15. That is, in a case where the sound control device of the company A, B, C, or E is selected, the CPU 407 makes the determination of Yes at S1302. In a case where the sound control device of the company D is selected, the CPU 407 makes the determination of No.

When the determination of No is made at S1302, the processing of the CPU 407 shifts to S1306 described below.

When the determination of Yes is made at S1302, the CPU 407 determines whether to execute sign-in on the operation panel of the communication device 1004 (S1303). In a case where the sound control device of the company A or E is selected, the CPU 407 makes the determination of Yes at S1303. In a case where the sound control device of the company B or C is selected, the CPU 407 makes the determination of No at S1303.

When the determination of Yes is made at S1303, the CPU 407 displays a sign-in screen on the operation panel (S1304) and accesses a server by using a user ID and a password that are input on the sign-in screen (S1305). In a case where the sound control device of the company A is selected, a sign-in screen 1402 is displayed at S1304. In a case where the sound control device of the company E is selected, a sign-in screen 1405 is displayed at S1304.

When the determination of No is made at S1303, the CPU 407 determines whether to print an invitation page (S1307). In a case where the sound control device of the company B is selected, the CPU 407 makes the determination of Yes at S1307. In a case where the sound control device of the company C is selected, the CPU 407 makes the determination of No at S1307.

When the determination of Yes is made at S1307, the CPU 407 displays a screen 1403 indicating that the invitation page is printed. In a case where an OK button is pressed on the screen 1403, the CPU 407 prints the invitation page (S1308). The CPU 407 transmits, to the server B, a print request of the invitation page and the Mac address of the communication device 1004, and then, receives print data of the invitation page from the server B. Then, the CPU 407 executes print processing based on the received print data. A dedicated URL related to registration processing of the communication device 1004 is printed on the invitation page that is printed. Thus, when the user inputs the URL on the invitation page to the mobile terminal 1002 or the like, a sign-in screen for the communication device 1004 is displayed in the mobile terminal 1002. The user inputs a user ID and a password on the sign-in screen for the communication device 1004, which is displayed in the mobile terminal 1002, for transmission to the server B. The server B executes sign-in processing based on the user ID and the password that are received from the sign-in screen for the communication device 1004. In a case where the processing is performed successfully, the server B manages the user ID received from the sign-in screen for the communication device 1004 and the Mac address of the communication device 1004 in association with each other. Then, the server B notifies the communication device 1004 that the sign-in is successful and transmits the user ID and the password to the communication device 1004. With the foregoing processing, the CPU 407 accesses the serve B at S1305 after the processing of S1308 (S1305).

When the determination of No is made at S1307, the CPU 407 displays a message 1404 indicating execution of association using the mobile terminal 1002 (S1309). That is, in a case where the sound control device of the company C is selected, S1309 is executed. The processing of S1309 corresponds to another processing in the aforementioned processing in which the communication device 1004 signs into the server 1006, so that detailed description thereof will be omitted. With the foregoing processing, the CPU 407 accesses the server C at S1305 after the processing of S1309 (S1305).

The CPU 407 then executes setting processing to cooperate with the sound control device after S1305 (S1306). For example, when not receiving print data for a predetermined time period, the communication device 1004 operates in a power saving mode. There is a first power saving mode in which the communication device 1004 executes print processing based on print data when receiving the print data during an operation in the power saving mode and a second power saving mode in which the communication device 1004 does not process print data even when receiving the print data. Power consumption in the second power saving mode is less than that in the first power saving mode. The CPU 407 sets the first power saving mode as the setting processing to cooperate with the sound control device. In the first power saving mode, print processing may be executed only when print data based on a print instruction by sound, which is received by the sound control device, is received.

While an example in which the user selects the sound control device has been described as the processing of S1301, another method can be used. For example, the communication device 1004 acquires device information from a sound control device that is found by executing device search. The CPU 407 can automatically select the sound control device to be cooperated with the communication device 1004 based on the device information acquired from the sound control device. In this case, the processing of S1301 is omitted.

With the foregoing processing, even when print data is transmitted in various paths, the communication device 1004 can appropriately execute print processing.

(Fourth Embodiment)

Figure 16:
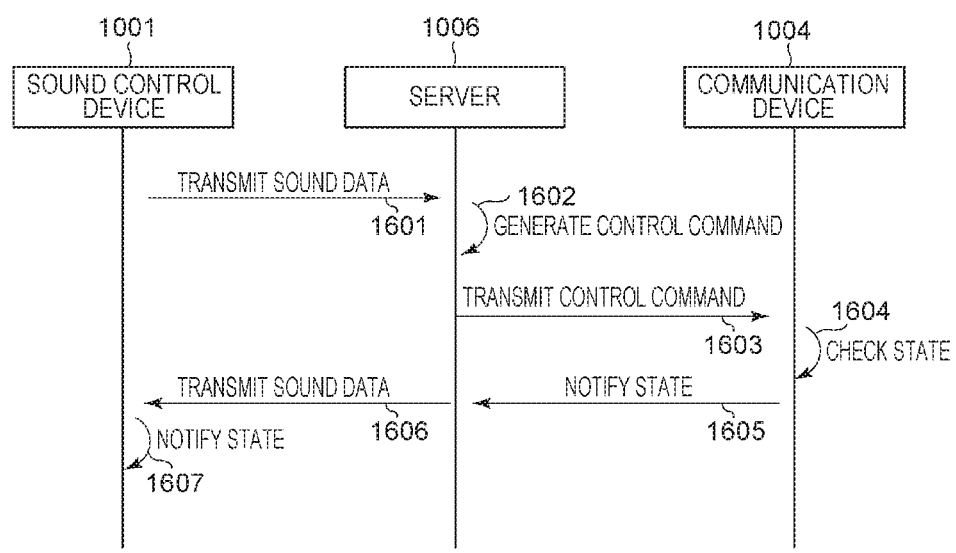
FIG. 16 is a sequence view related to processing different from printing.

Next, processing when the user requests processing other than printing by voice will be described with reference to FIG. 16. The processing illustrated in FIG. 16 can be executed in addition to the processing illustrated in FIGS. 7, 8, 9, 10A, 10B, 11, 12A, and 12B. For example, the user speaks "tell me a remaining amount of ink" after a wake word. The sound control device 1001 receives sound of the wake word and then receives sound spoken after the wake word. That is, the sound control device 1001 receives the sound of "tell me a remaining amount of ink".

The sound control device 1001 transmits, to the server 1006, the identification information (for example, Mac address or the like) of the sound control device 1001 and the sound data based on the received sound (1601).

The server 1006 analyzes the sound data transmitted from the sound control device 1001, generates a control command based on the sound data, and transmits the control command to the communication device 1004 (1602 to 1603). The control command includes an instruction to check a remaining amount of ink.

The communication device 1004 executes processing based on the control command. The communication device 1004 checks the remaining amount of ink and transmits a check result to the server 1006 (1604 to 1605). The server 1006 generates sound data based on the check result. For example, when receiving the check result indicating that cyan is in short, the server 1006 generates sound data indicating that cyan is in short.

The sound control device 1001 notifies the check result by sound based on the sound data that is received (1607). In addition to the remaining amount of ink, an inquiry about a state of the communication device, a remaining amount of paper, or the like can be received.

In a case where the user receives sound notification indicating that cyan ink is in short, the user can order cyan ink by voice. In this case, the sound control device 1001 receives a serial number that specifies a product type of the communication device 1004. Then, the sound control device 1001 transmits sound data indicating the order of cyan ink and the serial number to the server 1006. The server 1006 can generate order data based on the sound data and the serial number and place an order.

In a case where an error or the like is caused and an operation by the user is required, the communication device 1004 displays a method for the operation on the operation panel of the communication device 1004. At this time, sound data of an operation method for an operation that requires both of the user's hands as the operation of the user is generated and transmitted to the sound control device 1001. Then, the sound control device 1001 notifies the operation method by sound. Thereby, the user can perform the operation using both hands. For example, while a method for replacing ink can be displayed on the operation panel by the communication device 1004, occurrence of a paper jam during printing, cleaning of wiping ink, or the like can be notified by sound.

With the foregoing processing, the user can easily request an instruction other than printing.

(Other Embodiments)

Though description has been provided for a case where image data corresponding to a picture is printed in the foregoing embodiments, data to be printed is not limited to image data and can be document data.

Though description has been provided for an example in which the communication device 1004 performs printing of image data in the foregoing embodiments, without limitation thereto, the display device 1003 can be used instead of the communication device 1004 and the display device 1003 can display an image. For example, processing for causing the display device 1003 to display an image that is displayed in the mobile terminal 1002 by a display instruction to the sound control device 1001 or the mobile terminal 1002 by sound can be performed.

In the foregoing embodiments, as a sound control system, an example in which when the sound control device 1001 receives sound, sound data is transmitted to the server 1006, and the server 1006 generates a control command corresponding to the sound data is indicated. However, the sound control system is not limited thereto, and by including a function of the server 1006 in the sound control device 1001, the sound control device 1001 can operate alone as the sound control system according to the aforementioned embodiments. That is, the sound control device 1001 can perform input of sound, and perform analysis of sound data, generation of a control command, and transmission of the control command.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-193778 filed Oct. 3, 2017, which is hereby incorporated by reference herein in its entirety.

What is claimed is:

1. A printing method for a sound control system that receives sound data, a printer, and a terminal device, the printing method comprising:
    a storage step at which the sound control system stores identification information of the printer;
    a determination step at which the sound control system determines whether input sound data which is input to the sound control system is first sound data or second sound data different from the first sound data;
    a first transmission step at which, in a case where it is determined that the input sound data is the first sound data, the sound control system transmits the stored identification information of the printer to the terminal device;
    a second transmission step at which the terminal device transmits print data transmitted from a server to the terminal device, to the printer based on the transmitted identification information of the printer;
    a first print step at which the printer executes printing based on the transmitted print data;
    an acquisition step at which, in a case where it is determined that the input sound data is the second sound data, the printer acquires the print data from the server; and
    a second print step at which the printer executes printing based on the acquired print data.

2. The printing method according to claim 1, wherein in a case where it is determined that the sound data that is input is the second sound data, the server performs predetermined notification to the printer and the printer acquires the print data from the server in response to the predetermined notification.

3. The printing method according to claim 1, wherein the server is included in the sound control system.

4. The printing method according to claim 1, wherein the first sound data is data based on sound input to a microphone included in the sound control system.

5. The printing method according to claim 1, further comprising:
a third transmission step at which the terminal device transmits, to the sound control system, sound data based on sound input to a microphone included in the terminal device, wherein
the first sound data is the sound data transmitted at the third transmission step.

6. The printing method according to claim 1, further comprising:
a generation step at which the terminal device generates the print data based on data displayed by the terminal device, wherein
at the second transmission step, the terminal device transmits the generated print data to the printer.

7. The printing method according to claim 1, wherein the identification information of the printer is a Mac address of the printer.

8. A method for controlling a terminal device that communicates with a printer and a sound control system that receives sound data, the method comprising:
a first transmission step of, in a case where predetermined sound is input to the terminal device and identification information of the printer is registered in the terminal device, transmitting print data to the printer based on the identification information;
a second transmission step of, in a case where the predetermined sound is input to the terminal device and the identification information of the printer is not registered in the terminal device, transmitting sound data corresponding to the predetermined sound to the sound control system;
a reception step of receiving the identification information of the printer that is registered in the sound control system in response to transmission at the second transmission step; and
a third transmission step of transmitting the print data to the printer based on the identification information received in the reception step.

9. The method according to claim 8 further comprising a determination step of determining whether the identification information of the printer is registered.

10. The method according to claim 8 further comprising a generation step of generating the print data based on data that is displayed on the terminal device, wherein
the print data generated in the generation step is transmitted to the printer in the first transmission step and the third transmission step.

11. The method according to claim 8 further comprising a search step of searching for the printer based on the identification information of the printer received in the reception step, wherein the print data is transmitted to the printer detected in the search step in the third transmission step.

12. The method according to claim 8, wherein the identification information of the printer received in the reception step is a Mac address of the printer.

13. A method for a sound control system that receives sound data, a communication device, and a terminal device, the method comprising:
a storage step at which the sound control system stored identification information of the communication device;
a determination step at which the sound control system determines whether input sound data which is input to the sound control system is first sound data or second sound data different from the first sound data;
a first transmission step at which, in a case where it is determined that the input sound data is the first sound data, the sound control system transmits the stored identification information of the communication device to the terminal device;
a second transmission step at which the terminal device transmits data transmitted from a server to the terminal device, to the communication device based on the transmitted identification information of the communication device;
a first execution step at which the communication device executes predetermined process based on the transmitted data;
an acquisition step at which, in a case where it is determined that the input sound data is the second sound data, the communication device acquires the data from the server, and
a second execution step at which the communication device executes the predetermined process based on the acquired data.

14. A method for controlling a terminal device that communicated with a communication device and a sound control system that receives sound data, the method comprising:
a first transmission step of, in a case where predetermined sound is input to the terminal device and identification information of the communication device is registered in the terminal device, transmitting predetermined data to the communication device based on the identification information;
a second transmission step at which, in a case where the predetermined sound is input to the terminal device and the identification information of the communication device is not registered in the terminal device, the terminal device transmits sound data corresponding to the predetermined sound to the sound control system;
a reception step of receiving the identification information of the communication device that is registered in the sound control system in response to transmission at the second transmission step; and
a third transmission step of transmitting the predetermined data to the communication device based on the identification information received in the reception step.

15. A method for controlling a terminal device and a communication device each of which communicates with a sound control system that receives sound data, the method comprising:
a first transmission step at which, in a case where predetermined sound is input to the terminal device and identification information of the communication device is registered in the terminal device, the terminal device transmits predetermined data to the communication device based on the identification information; and
a second transmission step at which, in a case where the predetermined sound is input to the terminal device and the identification information of the communication device is not registered in the terminal device, the terminal device transmits sound data corresponding to the predetermined sound to the sound control system, wherein in a case where the sound data is transmitted to the sound control system and the identification information of the communication device is registered in the sound control system, the predetermined data is transmitted to the communication device based on the identification information registered in the sound control system.

* * * * *